United States Patent
Guo et al.

(10) Patent No.: US 10,075,255 B2
(45) Date of Patent: Sep. 11, 2018

(54) PHYSICAL DOWNLINK CONTROL CHANNEL (PDCCH) INTER-CELL-INTERFERENCE COORDINATION

(71) Applicant: Telefonaktiebolaget L M Ericsson (Publ), Stockholm (SE)

(72) Inventors: Shiguang Guo, Kanata (CA); Hong Ren, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 178 days.

(21) Appl. No.: 14/347,181

(22) PCT Filed: Mar. 11, 2014

(86) PCT No.: PCT/IB2014/059644
§ 371 (c)(1),
(2) Date: Mar. 25, 2014

(87) PCT Pub. No.: WO2015/136325
PCT Pub. Date: Sep. 17, 2015

(65) Prior Publication Data
US 2015/0263818 A1    Sep. 17, 2015

(51) Int. Cl.
*H04L 12/26* (2006.01)
*H04W 72/02* (2009.01)
(Continued)

(52) U.S. Cl.
CPC .......... *H04J 11/005* (2013.01); *H04L 5/0073* (2013.01); *H04W 72/082* (2013.01);
(Continued)

(58) Field of Classification Search
CPC ... H04W 36/28; H04W 36/20; H04W 72/042; H04B 25/00
(Continued)

(56) References Cited

U.S. PATENT DOCUMENTS

2002/0061073 A1* 5/2002 Huang .................. H04L 1/0003
375/295
2002/0077113 A1* 6/2002 Spaling ................. H04W 24/08
455/453

(Continued)

FOREIGN PATENT DOCUMENTS

| EP | 2 557 831 A1 | 2/2013 |
| EP | 2 672 747 A1 | 12/2013 |
| WO | 2013061162 A2 | 5/2013 |

OTHER PUBLICATIONS

International Search Report and Written Opinion dated Sep. 3, 2014 for International Application No. PCT/IB2014/059644; International Filing Date: Mar. 11, 2014 consisting of 14-pages.

(Continued)

*Primary Examiner* — Alpus H Hsu
*Assistant Examiner* — Camquyen Thai
(74) *Attorney, Agent, or Firm* — Patent Portfolio Builders, PLLC

(57) ABSTRACT

A method and system for allocating PDCCH resources in a wireless communication system are disclosed. According to one aspect, a method includes detecting at a first base station a condition of inter-cell interference, ICI, between a first cell and a neighboring cell, indicating that the first cell is in a coordination need state. The method includes generating at the first base station serving the first cell a request to lower a first PDCCH load of the neighboring cell to reduce the ICI between the first cell and the neighboring cell, a PDCCH load of a cell being defined as a ratio of used resource elements to total available resource elements within the cell.

22 Claims, 7 Drawing Sheets

(51) Int. Cl.
H04W 4/18 (2009.01)
H04J 11/00 (2006.01)
H04W 72/08 (2009.01)
H04L 5/00 (2006.01)
H04W 72/04 (2009.01)

(52) U.S. Cl.
CPC .......... *H04L 5/0048* (2013.01); *H04L 5/0053* (2013.01); *H04W 72/0486* (2013.01)

(58) Field of Classification Search
USPC .......... 370/252, 331, 501, 329; 455/69, 450, 455/63.1; 375/295
See application file for complete search history.

(56) References Cited

U.S. PATENT DOCUMENTS

| | | | | |
|---|---|---|---|---|
| 2008/0009244 A1* | 1/2008 | Lee | .............. | H04W 72/1231 455/69 |
| 2009/0264077 A1* | 10/2009 | Damnjanovic | ..... | H04W 52/244 455/63.1 |
| 2010/0120424 A1* | 5/2010 | Johansson | .............. | H04L 5/0053 455/435.1 |
| 2011/0014909 A1* | 1/2011 | Han | .............. | H04J 11/0093 455/423 |
| 2011/0249642 A1 | 10/2011 | Song et al. | | |
| 2011/0255514 A1* | 10/2011 | Olofsson | .......... | H04W 72/0426 370/331 |
| 2012/0014333 A1* | 1/2012 | Ji | .............. | H04L 5/0032 370/329 |
| 2012/0122465 A1* | 5/2012 | Landstrom | ........ | H04W 72/1252 455/450 |
| 2012/0207040 A1* | 8/2012 | Comsa | ............. | H04W 72/1215 370/252 |
| 2013/0086227 A1* | 4/2013 | Takao | .............. | H04L 67/00 709/219 |
| 2013/0114517 A1* | 5/2013 | Blankenship | ......... | H04L 5/0053 370/329 |
| 2013/0136074 A1* | 5/2013 | Okino | .............. | H04W 24/00 370/329 |
| 2014/0204745 A1* | 7/2014 | Nuss | .............. | H04W 28/08 370/232 |

OTHER PUBLICATIONS

Bakhti_and_Moghaddam—Inter_Cell_Interference_Coordination with Adaptive Frequency-Reuse for VoIP and Data Traffic in Downlink of 3GPP-LTE, Published in Application of Information and Communication Technologies (AICT), 2010 4th International Conference held in Tashkent, Uzbekistan, Oct. 12-14, 2010, E-ISBN: 978-1-4244-6904-8 consisting of 6-pages.
NSN and Nokia—3GPP_TSG_RAN_WG1_Meeting_#76_R1-140564, Prague, Czech Republic, Feb. 10-14, 2014, Agenda Item: 7.2.6, Title: Inter-eNB Signaling for EPDCCH Coordinaiton, Document for: Discussion and Decision consisting of 6-pages.
3GPP TS 36.211 V8.9.0 (Dec. 2009) 3rd Generation Partnership Project; Technical Specification Group Radio Access Network; Evolved Universal Terrestrial Radio Access (E-UTRA); Physical Channels and Modulation (Release 8) (Dec. 16, 2009) consisting of 83-pages.
3GPP TS 36.212 V8.8.0 (Dec. 2009) 3rd Generation Partnership Project; Technical Specification Group Radio Access Network; Evolved Universal Terrestrial Radio Access (E-UTRA); Multiplexing and channel coding (Release 8) (Dec. 16, 2009) consisting of 60-pages.
3GPP TS 36.213 V8.8.0 (Sep. 2009) 3rd Generation Partnership Project; Technical Specification Group Radio Access Network; Evolved Universal Terrestrial Radio Access (E-UTRA); Physical layer procedures (Release 8) consisting of (Sep. 29, 2009) 77-pages.
Written Opinion of the International Preliminary Examining Authority dated Feb. 17, 2016 for International Application No. PCT/IB2014/059644, International Filing Date: Mar. 11, 2014 consisting of 4-pages.
PCT Notification Concerning Transmittal of International Preliminary Report on Patentability Form/PCT/IB/326, dated Jun. 2, 2016 for International Application No. PCT/IB2014/059644, International Filing Date: Mar. 11, 2014 consisting of 38-pages.

* cited by examiner

PHYSICAL DOWNLINK CONTROL CHANNEL (PDCCH) INTER-CELL-INTERFERENCE COORDINATION

FIELD

The present invention relates to wireless communications and in particular to allocation and use of wireless physical downlink control channel (PDCCH) resources.

BACKGROUND

The demand on wireless data services has grown exponentially over the last ten years, driven particularly by the popularity of smart phones. To meet this growing demand, new generations of wireless standards with both multiple input and multiple output (MIMO) and orthogonal frequency division multiple access (OFDMA) and/or single carrier frequency division multiple access (SC-FDMA) technologies have been developed, such as 3GPP (3rd Generation Partnership Program) LTE (Long Term Evolution) and WIMAX (Worldwide Interoperability for Microwave Access). These standards prescribe base stations, such as eNBs in LTE, that divide geographic coverage areas into cells, with each base station serving at least one cell.

One challenge of capacity growth is the optimal use of the limited radio resources shared by multiple user equipment (UE), such as physical downlink control channel (PDCCH) use. In 3GPP LTE systems, the PDCCH carries important scheduling information and instructs the UE where to look for the physical downlink shared channel (PDSCH) and where to send the physical uplink shared channel (PUSCH). For voice over Internet protocol (VoIP) calls, the demand on PDCCH is high. Another challenge is maintaining performance of UEs at the cell edge.

The PDCCH carries downlink control information (DCI) which includes scheduling information for both the uplink and downlink. The DCI provides the UE with necessary information for proper reception and decoding of downlink data transmissions. A UE may be assigned one or more DCIs in a given transmission time interval (TTI). The PDCCH which carries the DCI consists of multiple control channel elements (CCE), where each CCE has multiple resource element groups (REG). Therefore, the REG is the building block of the PDDCH. Multiple REGs for each PDDCH for different users are interleaved and spread among multiple time-frequency resource elements (RE) in order to improve time and frequency diversity at the UE receiver for blind decoding. This allows for minimum inter-cell interference (ICI) among cells, where ICI arises from the signals transmitted into one cell carrying over into one or more neighboring cells.

As noted above, voice over Internet protocol (VoIP) calls place a high demand on the PDDCH. This is because the size of a VoIP packet is small and delay sensitive, therefore requiring a large control region. Thus, in the event of a high number of VoIP calls in a cell, the data region of the PDSCH may be wasted due to high use of the PDCCH. This is shown symbolically in FIG. 1. The data region of the PUSCH may also be wasted as a result of the high use of the PDCCH. In fact, for VoIP, PDCCH capacity is a key limiting factor as the demand on DCI is very high.

PDCCH link adaptation (LA) is used to choose an optimal CCE aggregation level for each DCI based on radio channel conditions, as measured and reported by the UE as a channel quality indicator (CQI). If the channel condition is good, i.e., for higher CQI, a fewer number of CCEs or a lower CCE aggregation level is used. Conversely, for lower CQI, a higher number of CCEs or a higher CCE aggregation level is used. Since the number of CCEs for each TTI is limited, the performance of PDCCH link adaptation will greatly impact the performance of the LTE radio access network. If the PDCCH LA is too aggressive, i.e., using fewer CCEs, some UEs will have a greater rate of PDCCH decoding failure, in which case, the UE cannot locate the related downlink data on the PDSCH or properly uplink data on the PUSCH. On the other hand, if PDCCH LA is too conservative, using greater numbers of CCEs, then fewer UEs can be accommodated by the available PDCCH resources, resulting in lower capacity. In addition to adjusting CCE aggregation level, PDCCH transmit power per user can be controlled to improve PDCCH detection at a UE.

Currently, there are only 4 CCE settings: 1, 2, 4 and 8. A problem with existing processes for adjusting a number of CCEs used for the PDCCH, is that CCE aggregation level setting is too coarse. Further, determination of the CCE aggregation level is currently too slow, resulting in less than optimal performance, especially for UEs at the cell edge. Also, power control of the PDCCH may result in higher interference for UEs in adjacent cells. PDCCH inter-cell interference coordination (ICIC) may be used to reduce the amount of interference experienced by a UE. However, the interference is still present. In case of a heterogeneous network (Hetnet) deployment of devices with different operating systems and protocols, interference can be eliminated, but only with a large waste of radio resources.

SUMMARY

The present invention advantageously provides a method and system for allocating PDCCH resources in a wireless communication system. According to one aspect, a method includes detecting at a first base station a condition of inter-cell interference, ICI, between a first cell and a neighboring cell, indicating that the first cell is in a coordination need state. The method includes generating at the first base station serving the first cell a request to lower a first PDCCH load of the neighboring cell to reduce the ICI between the first cell and the neighboring cell, a PDCCH load of a cell being a ratio of used resource elements to total available resource elements within the cell.

According to this aspect, in some embodiments, a base station serving the neighboring cell is a second base station different from the first base station. In some embodiments, the request is conditioned upon a number of user equipments, UEs, in the first cell exceeding a threshold. In some embodiments, the request is conditioned upon a number of cell-edge user equipments, UEs, in the first cell exceeding a threshold. In some embodiments, the request is conditioned upon a number of user equipments using voice over Internet protocol, VoIP, exceeding a threshold. In some embodiments, the request is conditioned upon a channel quality indication from at least one UE falling below a threshold. In some embodiments, the base station serving the first cell may receive from a base station serving the neighboring cell an indication as to whether the base station serving the neighboring cell is in a capable state indicating a capability to lower the first PDCCH load in response to the request. In some embodiments, the base station serving the first cell generates an indication whether the first base station is in a capable state indicating a capability to lower a second PDCCH load of the first base station in order to assist the neighboring cell. In these embodiments, the indicated capability may be based on a current capacity utilization of the first cell, the current capacity utilization being one of a number of voice over Internet protocol, VoIP, users and a number of cell-edge users in the first cell. In some embodiments, the indicated capability is based on a bandwidth of the first cell, a total number of users in the first cell and a traffic type of users of the first cell.

According to another aspect, a base station serving a first cell in a wireless communication system includes a memory, a processor and a transmitter. The memory is configured to store a request directed to a neighboring cell to lower a first physical downlink control channel, PDCCH, load of the neighboring cell, the PDCCH load of a cell being a ratio of used resource elements to total available resource elements within the cell. The processor is configured to detect an inter-cell interference, ICI, condition between the first cell and the neighboring cell. The transmitter is configured to send the request to the base station serving the neighboring cell in response to the detecting of an ICI condition.

According to this aspect, in some embodiments, an ICI condition is detected by the processor when a number of user equipments, UEs, in the first cell exceeds a threshold. In some embodiments, the base station includes a receiver configured to receive a response from the neighboring cell, the response indicating whether and to what extent a base station serving the neighboring cell will lower the first PDCCH load. In these embodiments, the receiver may be configured to receive a request from the base station serving a neighboring cell to lower a second PDCCH load associated with the first cell. In some embodiments, the processor is further configured to generate an indication as to whether the base station is in a capable state indicating a capability to lower the second PDCCH load in order to assist the neighboring cell.

According to another aspect, the invention provides a method of allocating physical down link control channel, PDCCH, resources in a wireless communication system. The method includes receiving at a first base station serving a first cell from a base station serving a neighboring cell a request to lower a first PDCCH load of the first cell to reduce inter-cell interference, ICI, between the first cell and the neighboring cell, a PDCCH load of a cell being a ratio of used resource elements to total available resource elements within the cell. The method further includes determining whether to lower the first PDCCH load of the first cell, the determination being based on an extent to which a capacity to serve user equipments in the first cell is available.

According to this aspect, in some embodiments, upon determining to lower the first PDCCH load of the first cell, an indication that the first PDCCH is to be lowered is transmitted to a base station serving the neighboring cell. In some embodiments, the method includes sending from the first base station to a base station serving a neighboring cell a request for the base station serving the neighboring cell to lower a second PDCCH load of the neighboring cell.

According to another aspect, the invention provides a base station in a wireless communication system. The base station includes a memory, a processor and a receiver. The memory is configured to store a request received from a neighboring cell to lower a first physical downlink control channel, PDCCH, load of the first cell, a PDCCH load of a cell being a ratio of used resource elements to total available resource elements within the cell. The processor is configured to determine whether to lower the first PDCCH load of the first cell, the determination being based on an extent to which a capacity to serve the user equipments in the first cell is available. The receiver is configured to receive the request.

According to this aspect, in some embodiments, the base station further includes a transmitter configured to send a response to a base station serving the neighboring cell an extent to which the PDCCH load of the first cell is to be lowered. In these embodiments, the transmitter may be further configured to send a request to the base station serving the neighboring cell requesting that a second PDCCH load of the neighboring cell be lowered. In some embodiments, the receiver is further configured to receive a response to the request to the base station serving the neighboring cell, the response indicating an extent to which the base station serving the neighboring cell will lower the PDCCH load of the neighboring cell.

According to another aspect, the invention provides a base station that includes a receiver module and a determiner module. The receiver module is configured to receive a request to lower a physical downlink control channel, PDCCH, load for a cell served by the base station, a PDCCH load of a cell being a ratio of used resource elements to total available resource elements within the cell. The determiner module is configured to determine whether to lower the first PDCCH load based on an extent to which a capacity to serve user equipments in the first cell is available.

According to this aspect, the base station may further include a transmitter module for transmitting to a base station serving a neighboring cell an indication that the PDCCH load is to be lowered.

According to another aspect, the invention provides a base station that includes a determiner module and a transmitter module. The determiner module is configured to determine whether a condition of inter-cell interference, ICI, exists between a first cell served by the base station and a neighboring cell. The transmitter module is configured to transmit a request to lower a physical downlink control channel, PDCCH, load of the neighboring cell to reduce the ICI, a PDCCH load of a cell being a ratio of used resource elements to total available resource elements within the cell.

According to this aspect, the base station may further include a receiver module for receiving a response from a base station serving the neighboring cell whether the PDCCH load is to be lowered.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
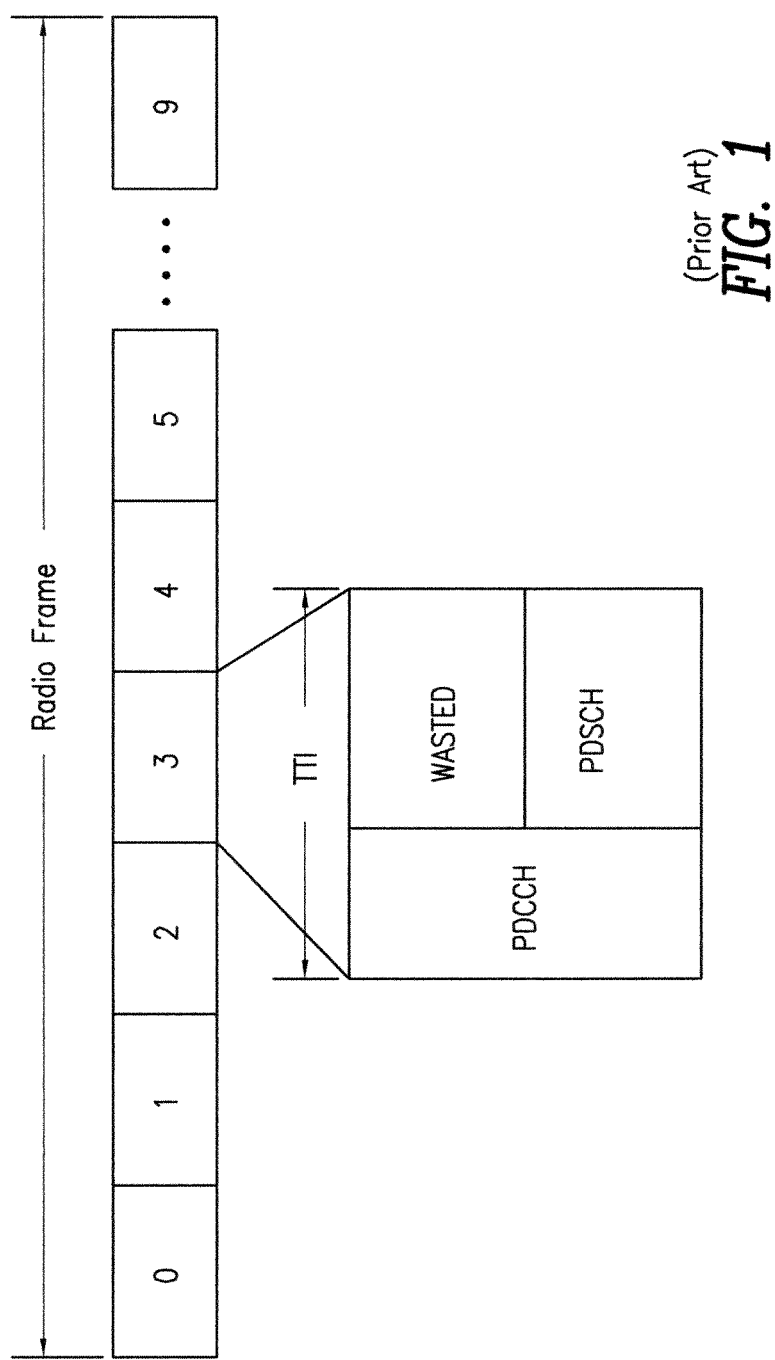
FIG. 1 shows a PDCCH and PDSCH for a TTI when there are wasted PDSCH resources due to high VoIP volume.

Before describing in detail exemplary embodiments that are in accordance with the present invention, it is noted that the embodiments reside primarily in combinations of apparatus components and processing steps related to allocation of PDCCH resources. Accordingly, components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In some embodiments described herein, a PDCCH load of a cell may be reduced in order to reduce PDCCH inter-cell interference (ICI) to its neighboring cells. A PDCCH load may be defined as a ratio of total used resource elements (RE) to available REs within a cell. The PDCCH load is a per-cell attribute which controls a percentage of control region utilization for the cell. In some embodiments, the PDCCH load of a cell can be set according to a request from a neighboring cell that seeks to reduce its inter-cell interference in an event of high capacity or load. Such high capacity events may include when the neighboring cell is congested, or has a high number of UEs at a cell edge or has a high number of UEs using VoIP.

The lower the PDCCH load of a cell, the lower will be the ICI it contributes to neighboring cells. Thus, a requesting cell seeking to improve its ICI can ask its neighboring cells to reduce their PDCCH load and use only certain ones of the available PDCCH symbols. A neighboring cell receiving the request can respond by indicating that it will or will not grant the request, or can specify an alternative PDCCH load that will be chosen by the neighboring cell. After the requesting cell receives responses from all neighboring cells, the requesting cell can determine what PDCCH load to utilize for the UEs of the requesting cell. Thus, a low capacity neighboring cell can help a high capacity requesting cell dynamically, and without a need for control at a central location.

Figure 2:
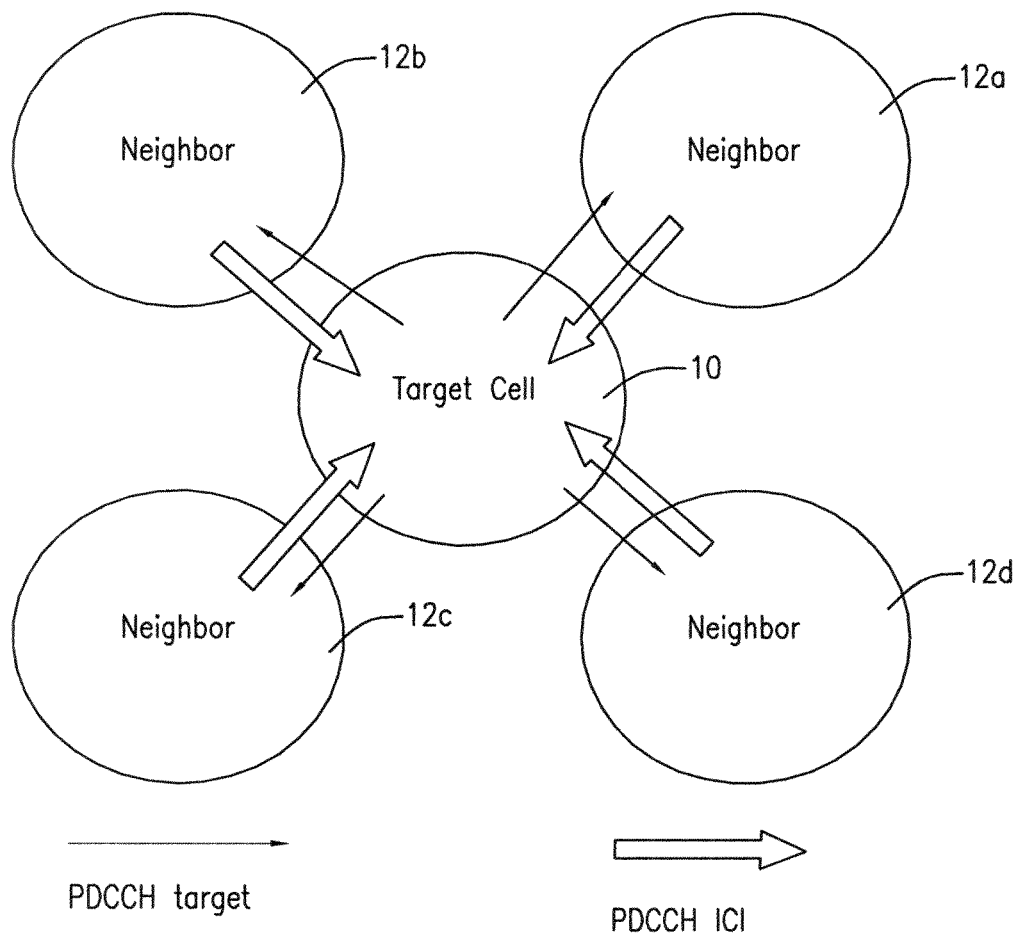
FIG. 2 is diagram of a target cell surrounded by neighboring cells and experiencing high ICI.

Referring again to the drawing figures, there is shown in FIG. 2 an illustration of a target cell 10 surrounded by 4 neighboring cells 12. In a practical deployment, the distribution of UEs among cells is not uniform. Some cells may have more users and some may have less. For example, a cell, in which a shopping mall is located, tends to have higher user density; while a cell in which a pond is located tends to have less user density. Therefore, the capacity requirement for these cells is different. Network planning and cell site selection will not guarantee even distribution of UE density. Even when cell sites are initially chosen to achieve even user density, UE density can change over time, for example, when new buildings are constructed or when a special event such as a football game causes a temporary increase in user density. Thus, it is entirely possible and even likely that a neighboring cell may have more PDCCH capacity than a requesting cell. The terms "requesting cell" and "target cell" will be used herein interchangeably.

As shown in FIG. 2, the target or requesting cell 10 may experience PDCCH ICI from neighboring base stations and, consequently, may request the neighboring cells 12 to lower their PDCCH load in order to reduce ICI. The target cell 10 may be configured to detect when the ICI experienced by the target cell 10 exceeds a threshold as measured by CQIs from a plurality of UEs. Alternatively, the target cell 10 may issue a request based on a high number of cell-edge UEs exceeding a threshold. As another example, the target cell 10 may issue a request based on a high number of VoIP calls for the target cell 10 exceeding a threshold. As yet another example, the target cell 10 may issue a request based on a total number of active UEs in the target cell or total number of cell-edge UEs.

Note that one or more neighboring cells 12a, 12b, 12c, and 12d, referred to collectively as neighboring cells 12, may be serviced by the same base station that serves the target cell 10. When the target cell 10 and a neighboring cell 12 are served by the same base station, a request by the target cell 10 to the neighboring cell 12 served by the same base station is handled internally at the base station. When the target cell 10 and the neighboring cell 12 are served by different base stations, the request may be sent from one base station to the other base station over an X2 interface.

Once a target cell 10 requests a neighboring cell to reduce its PDCCH load or to reduce the number of symbols used to represent each PDCCH, the neighboring cell 12 will evaluate whether it is capable of reducing its PDCCH load. If the neighboring cell 12a, for example, is not able to reduce its PDCCH load, it informs the target cell 10, and the target cell will seek a reduction of a PDCCH load from other neighboring cells 12b, 12c and 12d. If a neighboring cell 12 is able to reduce its PDCCH load, the neighboring cell 12 sends this information to the target cell 10. Based on the information received from all its neighboring cells 12, the target cell 10 can decide whether and by how much to increase its own PDCCH load.

Figure 3:
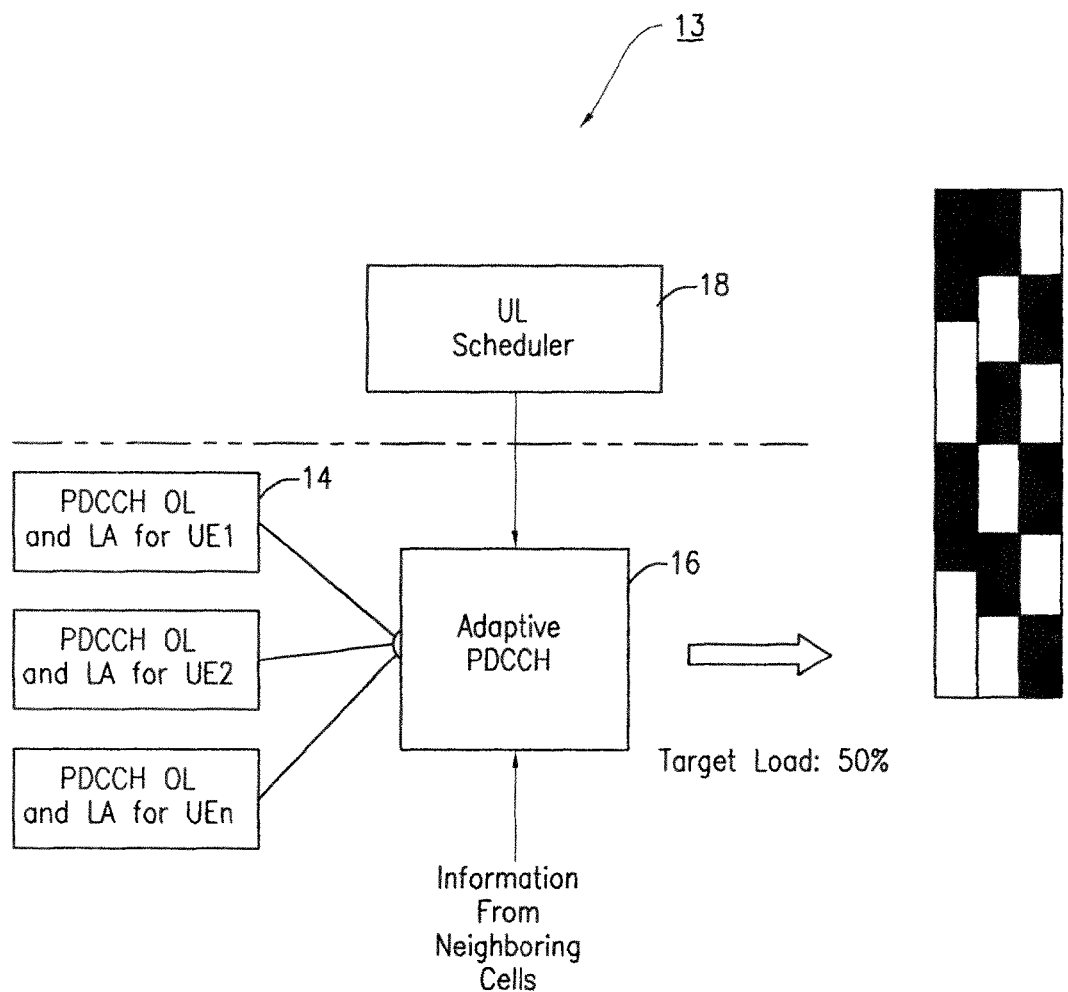
FIG. 3 is a block diagram of an PDCCH scheduler constructed according to embodiments described herein.

FIG. 3 shows an eNB PDCCH scheduler 13 according to embodiments described herein that enable a cell to calculate and adjust the cell's PDCCH load in response to information received from neighboring cells. Thus, the eNB PDCCH scheduler 13 is found in each of the target cell 10 and neighboring cells 12 of FIG. 2. In the target cell 10, the PDCCH scheduler 13 receives PDCCH information from the neighboring cells 12, including a PDCCH load of each neighboring cell. In the neighboring cell 12, the PDCCH scheduler 13 receives PDCCH information from the target cell, including a request to lower the neighboring cell's PDCCH.

Initially, CCE allocations for each UE are based on a conventional outer loop (OL) and link adaptation (LA) calculation, as performed by PDCCH allocators 14. Then, an adaptive PDCCH assignment module 16 adjusts the CCE allocations per UE to achieve a target load for the cell. The CCE allocations by the adaptive PDCCH assignment module 16 are based at least in part on input from an uplink scheduler 18. f Functions of the uplink scheduler 18 include scheduling uplink radio resources and informing the PDCCH assignment module 16 how many uplink CCEs are needed. The CCE allocations made by the adaptive PDCCH assignment module 16 is also based on PDDCH information received from neighboring cells 12. In the target cell, this PDCCH information includes a PDCCH load for each neighboring cell 12. The lower the PDCCH load, the less ICI interference will be experienced by the target cell 10, and the higher the PDCCH load of the target cell 10 can be. In a neighboring cell 12, the PDCCH information input to the PDCCH assignment module 16 includes a request and a target PDCCH load from the target cell 10, indicating a PDCCH load the requested neighboring cell 12 is requested to adopt.

In the example of FIG. 3, the target ratio is 50%, but other target loads may be selected depending, for example, on channel conditions, available bandwidth, VoIP use, and cell-edge UE population, as well as depending on, for example, the PDCCH load of neighboring cells and number of PDCCH symbols used by neighboring cells. A target ratio or load of 50% means that the adaptive PDCCH module will determine a number of PDCCH symbols to be dropped for one or more UEs so that the used resource elements (REs) are less than 50%. This implies that 50% of the control region during a TTI has no transmit power, so that interference to neighboring cells will be reduced.

A requesting cell may, therefore, request neighboring cells to lower their PDCCH loads, to reduce ICI from the neighboring cells. This lowering, of itself, will reduce ICI. Also, this lowering may enable the PDCCH load to be increased, thereby reducing ICI. As noted, a request may be generated based on, for example, congestion of the requesting cell exceeding a threshold, a number of cell-edge UEs of the requesting cell exceeding a threshold, and an amount of VoIP users in the requesting cell exceeding a threshold. When such conditions exist, the requesting cell is said to be in a coordination need state or simply a need state. When such conditions do not exist, the requesting cell is said to be in a no-need state.

Each neighboring cell that receives a request from the requesting cell will determine for itself whether to respond to the request by lowering its PDCCH load. If a neighboring cell is capable of lowering its PDCCH load, the neighboring cell is said to be in a capable state. If the neighboring cell is not capable of lowering its PDCCH load, because for example, the neighboring cell is congested, the neighboring cell is said to be in a not-capable state. A neighboring cell in a capable state decides how much it can lower its PDCCH load and reports this to the requesting cell. If the neighboring cell is in a not-capable state, this is reported to the requesting cell. If the neighboring cell is helping the requesting cell by reducing the neighboring cell's PDCCH load, the neighboring cell is said to be in a helping state. Otherwise, the neighboring cell is said to be in a not-helping state. For simplicity, reference herein to a reduction of a PDCCH load may also imply a reduction in a number of symbols used to represent a PDCCH.

Figure 4:
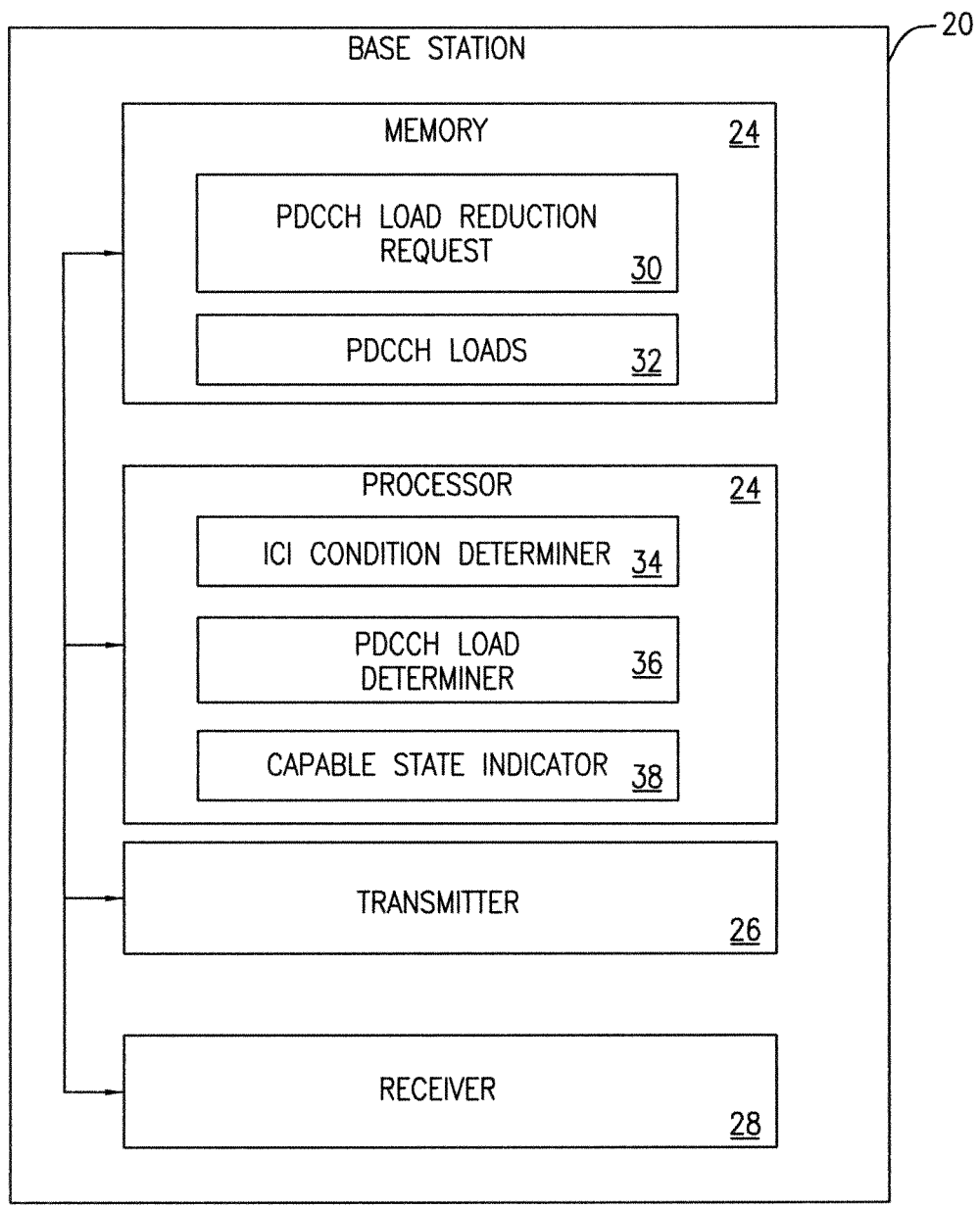
FIG. 4 is a block diagram of a base station that may designate a first cell as a requesting cell and adjacent cells as neighboring cells.

FIG. 4 is a block diagram of a base station 20, such as an eNB in an LTE system, that can serve one or more cells, and that may designate a first cell as a requesting cell and adjacent cells as neighboring cells. For example, if one of the cells being served by the base station 20 is experiencing congestion, or has too many cell-edge UEs or too many VoIP-using UEs, the base station 20 may designate the cell as being in a need state. The base station 20 may then determine which, if any, of the neighboring cells served by the base station 20 are in a capable state. Also, the base station 20 may seek this information about a cell not served by the base station 20 from a nearby base station that does serve the cell in question. The request for this information from another base station and the response of the other base station may be carried by a pre-existing X1 interface.

The base station 20 includes a memory 22, a processor 24, a transmitter 26 and a receiver 28 that inter-operate with one another. The processor 24 performs the functions of the PDCCH scheduler 13 as well as other base station functions. However, for clarity, only functions of the adaptive PDCCH assignment module 16 (of FIG. 3) are shown in the processor 24 of FIG. 4. The memory 22 stores programmatic code for execution by the processor 24 and also stores data. The stored data includes one or more PDDCH load reduction requests 30, PDCCH load information 32 associated with each cell served by the base station 20, and PDCCH load information 32 from neighboring cells served by neighboring base stations. The PDCCH load information may include the PDCCH load of a neighboring base station.

The processor 24 includes an ICI determiner 34 that determines for a cell, whether the cell is experiencing high ICI. This may be based, for example, on CQIs measured and received from the UEs in the cell, the number of UEs at the cell-edge or the number of UEs using VoIP. The determination may also be based on a number of users using a predetermined load-intensive application. For example, the ICI determiner 34 may compare the number of current cell-edge UEs to a threshold, and if the threshold is exceeded, the ICI determiner 34 may determine that an ICI condition exists and that the particular cell is in a "need" state. As another example, the ICI determiner 34 may compare the number of VoIP users to a threshold, and if the threshold is exceeded, the ICI determiner 34 may determine that an ICI condition exists and that the particular cell is in a "need" state.

The processor 24 also includes a PDCCH load determiner 36. The PDCCH load determiner 36 determines whether to reduce a PDCCH load of a cell and determines a value of a PDCCH load for each cell served by the base station 20. This may include at least one of lowering a PDCCH load. For example, a requesting cell may have a first PDCCH load it desires to increase due to ICI experienced by the first cell. The PDCCH load determiner 36 may determine a current PDCCH load of the neighboring cells. The PDCCH may also, based on the result of the ICI determiner 34 as to the level of ICI of a neighboring base station, determine a PDCCH load to assign to the neighboring base station. The processor 24 also includes a capable state indicator 38 to indicate whether a cell is in a "capable" state. For example, if a neighboring base station is capable of helping the requesting base station, as determined by the capable state indicator 38, the PDCCH determiner 36 may, upon request, reduce the PDCCH load of the neighboring base station and may also increase the PDCCH of the requesting base station. The base station 20 also includes a transmitter 26 for transmitting the PDCCHs to UEs in the cells served by the base station 20 and includes a receiver 28 for receiving data from UEs on the PUSCH.

Figure 5:
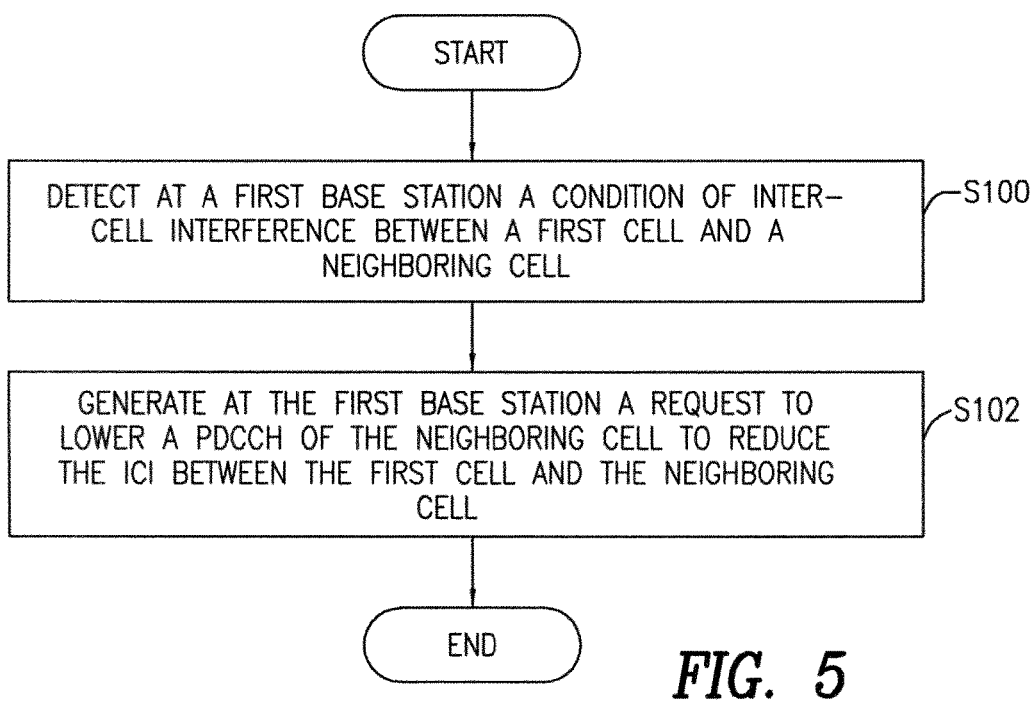
FIG. 5 is a flowchart of an exemplary process for adjusting PDCCH loads of neighboring cells in response to a request by a requesting cell.

FIG. 5 is a flowchart of an exemplary process for adjusting PDCCH loads of neighboring cells 12 in response to a request by a requesting cell 10. A first base station serving a first cell detects a condition of ICI between the first cell and at least one other neighboring cell 12 (block S100). As noted above, the ICI condition may be, for example, one of a number of UEs in the cell exceeding a threshold, a number of cell-edge UEs exceeding a threshold, or a number of VoIP-using UEs exceeding a threshold. When the ICI condition is detected, the first base station serving the first cell generates a request to lower the PDCCH load of a neighboring cell 12 in order to reduce the ICI (block S102). As noted above, if the first base station serves both the first cell 10 and the neighboring cell 12, then the request is internal to the first base station. Alternatively, the request may be sent between base stations over an X1 interface.

Figure 6:
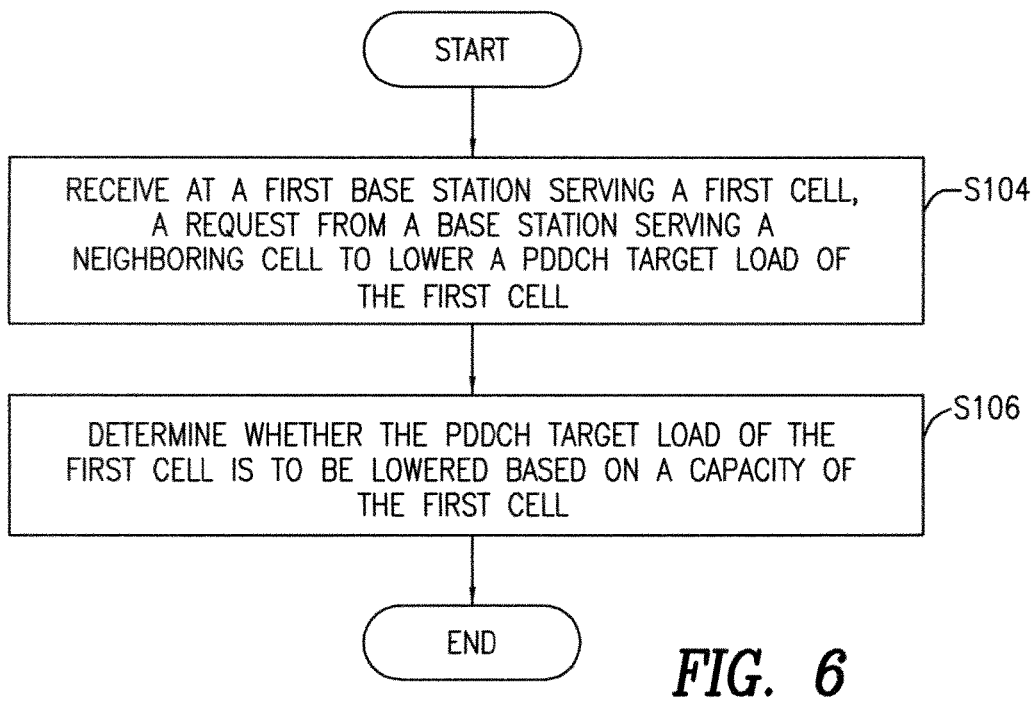
FIG. 6 is a flowchart of an exemplary process for adjusting PDCCH load in response to a request received from a requesting base station.

FIG. 6 is a flowchart of an exemplary process for adjusting PDCCH load in response to a request received from a requesting base station 10. A first base station serving a first cell receives a request from a base station serving a neighboring cell to lower the PDCCH load of the first cell (block S104). When, both the first cell and the neighboring cell are served by the same base station, the request is internal to the base station. In response to the request, the first base station determines if the PDCCH load of the first cell can be lowered (block S106). This decision may be based on, for example, a current available capacity of the first cell, a number of UEs on the edge of the first cell, or a number of VoIP users of the first cell.

Figure 7:
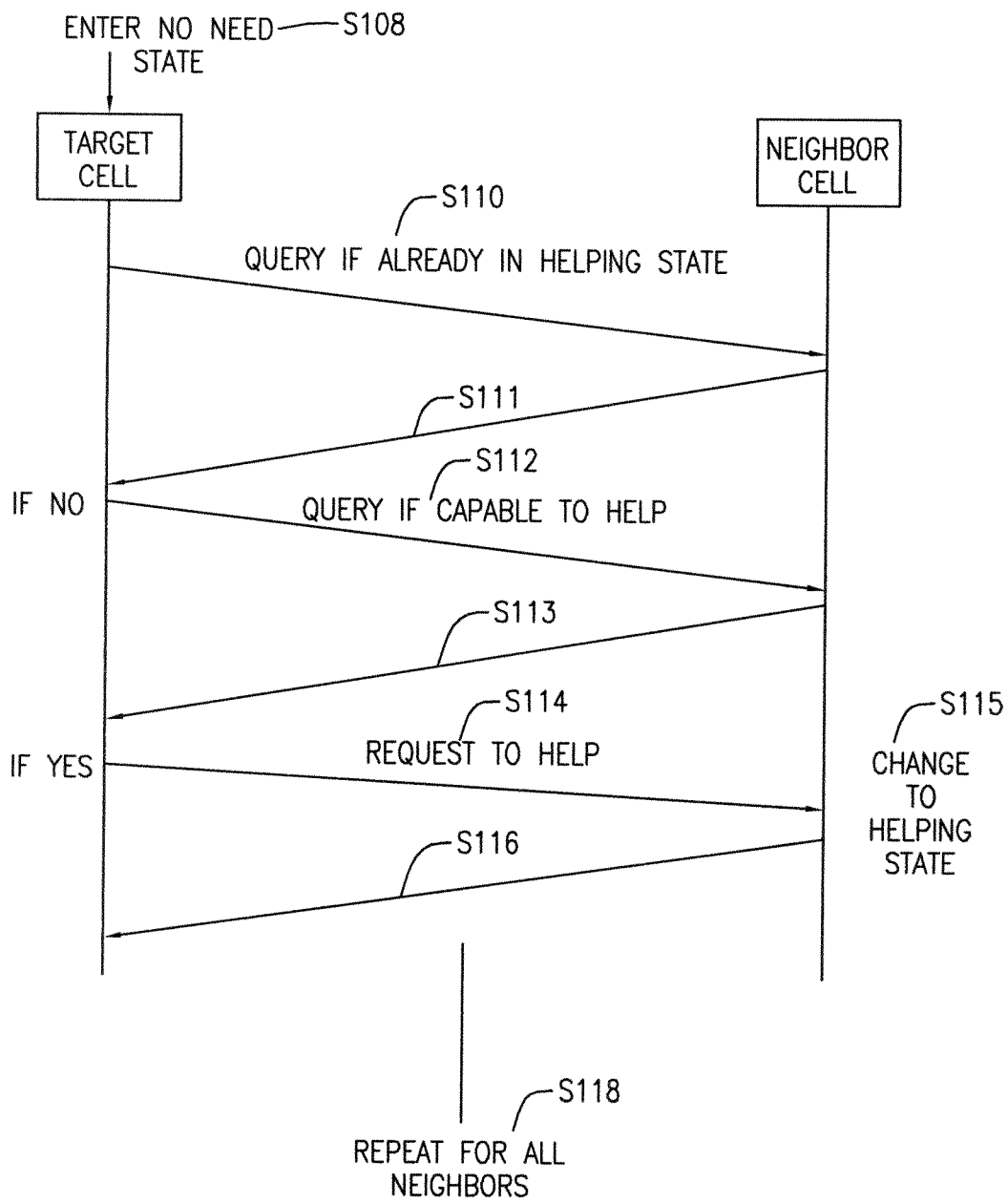
FIG. 7 is a flow diagram of an exemplary exchange of messages between a target cell and a neighbor cell in the event that the target cell enters a coordination need state.

FIG. 7 is a flow diagram of an exemplary exchange of messages between a target cell 10 and a neighboring cell 12 in the event that the target cell 10 enters a coordination need state (element S108). Initially, each cell starts in a no-need, not-helping and capable state. The target cell 10 may enter the need state in the event of one or more of the conditions described above; namely, for example, excess users in the cell, excess users at the edge of the cell, and excess users using VoIP. Upon entering the need state, the target cell 10 may enter the not-capable state and sends a query message to the neighboring cell 12 to determine if the neighboring cell 12 is already in a helping state (element S110).

The helping/not helping status of the neighboring cell 12 is returned from the neighboring cell 12 to the target cell 10 (element S111). If the neighboring cell 12 is not already in the helping state, the target cell 10 sends a query message to the neighboring cell 12 to determine if the neighboring cell 12 is capable to help (element S112). The capable/not capable status of the neighboring cell 12 is returned from the neighboring cell 12 to the target cell 10 (element S113). If the neighboring cell 12 is in the capable state, the target cell 10 sends a message requesting help from the neighboring cell 12 (element S114). In response, the neighboring cell 12 enters the helping state (element S115).

The neighboring cell 12 then informs the target cell 10 that the neighboring cell 12 is in the helping state (element S116) and may optionally inform the target cell 10 of a duration of time that the neighboring cell 12 will remain in the helping state. The target cell 10 may automatically request from the neighboring cell 12 a renewal of the helping state at the expiration of the previous helping state. The process may be repeated for all other neighboring cells 12 (element S118).

Note that in some embodiments, a cell can be in a need state and a capable state at the same time. For example, the total number of active UEs in a cell may be within limits, indicating a capable state, while the number of cell-edge UEs may exceed a threshold, indicating a need state.

Figure 8:
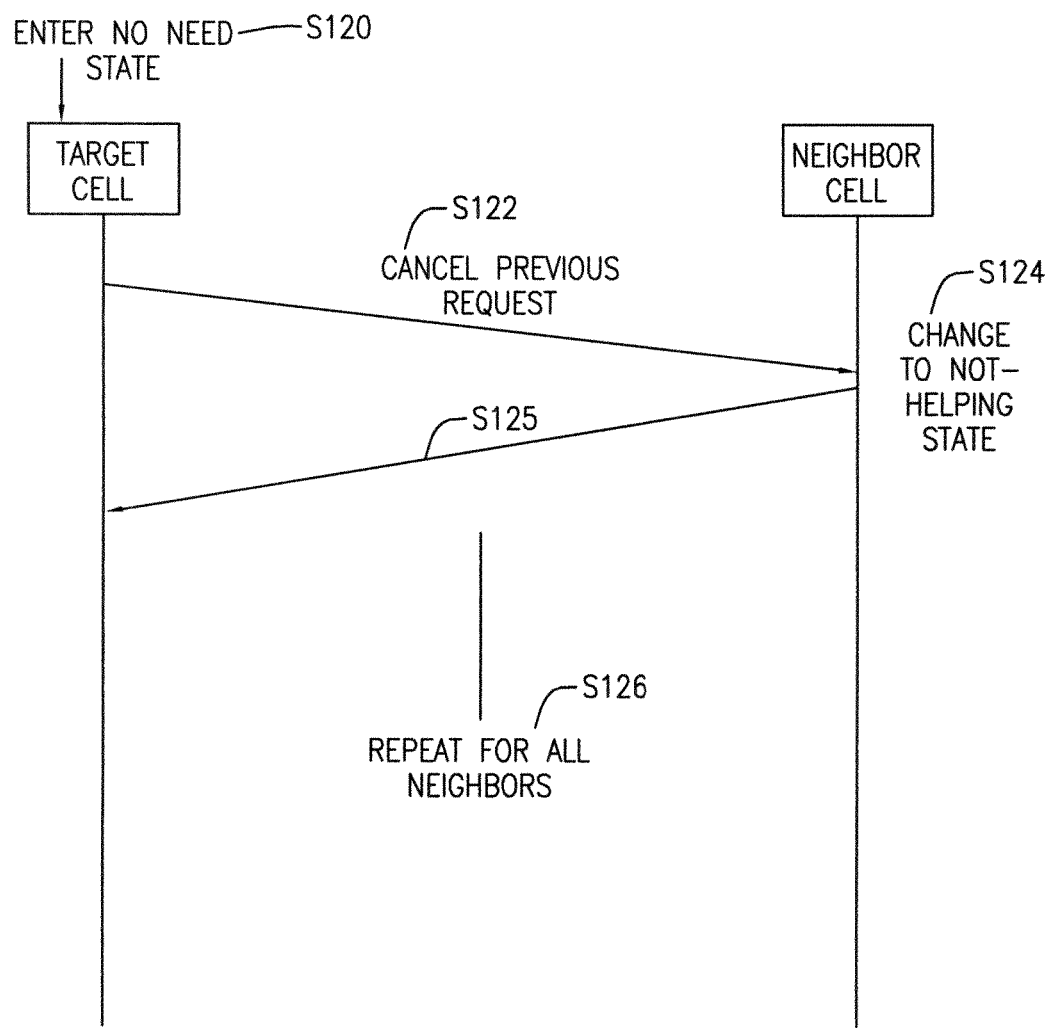
FIG. 8 is a flow diagram of an exemplary exchange of messages between a target cell and a neighbor cell in the event that the target cell enters a no-need state.

FIG. 8 is a flow diagram of an exemplary exchange of messages between a target cell 10 and a neighboring cell 12 in the event that the target cell 10 enters a no-need state (element S120). Upon entering the no-need state, the target cell 10 sends a message to the neighboring cell 12 to cancel the previous help request (element S122). In response, the neighboring cell 12 switches from the helping state to the not helping state (element S124). The neighboring cell 12 may inform the target cell that it has entered the not helping state (element S125). The process may be repeated for all other neighboring cells 12 (element S126).

Embodiments described herein provide per-cell PDDCH coordination among neighboring cells. A cell can help its neighboring cells to achieve a more optimal PDCCH performance in case of a congested cell, a heavy population of cell-edge UEs, and a heavy population of UEs using VoIP. Non-congested neighboring cells may reduce their PDCCH load to help congested cells by reducing ICI. Then, the target cell can handle more users, while the neighboring cells maintain adequate performance. This improves overall cell and network capacity and resource utilization efficiency without a need for centralized processing.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of allocating physical downlink control channel, PDCCH, resources in a wireless communication system, the method comprising:
   detecting at a first base station, a condition of inter-cell interference, ICI, between a first cell and at least one neighboring cell, wherein the condition of ICI indicates that the first cell is in a coordination need state;
   generating, at the first base station serving the first cell, a request to lower a first PDCCH load of the at least one neighboring cell to reduce the ICI between the first cell and the neighboring cell, a PDCCH load of a cell being a ratio of used resource elements to total available resource elements within the cell;
   receiving a response from the at least one neighboring cell, wherein the response is indicative of whether and to what extent a base station serving the at least one neighboring cell will lower the first PDCCH load of the at least one neighboring cell, wherein the base station serving the at least one neighboring cell informs the first cell regarding a predefined time duration to be in a helping state to lower the first PDCCH load, and wherein the first cell is configured to automatically request the at least one neighboring cell to renew the helping state; and based on a response received from the at least one neighboring cell, determining to what extent the first base station will increase a PDCCH load of the first cell.

2. The method of claim 1, wherein the base station serving the neighboring cell is a second base station different from the first base station.

3. The method of claim 1, wherein the request to lower the first PDCCH load of the at least one neighboring cell is conditioned upon a number of user equipments, UEs, in the first cell exceeding a threshold.

4. The method of claim 1, wherein the request to lower the first PDCCH load of the at least one neighboring cell is conditioned upon a number of cell-edge UEs in the first cell exceeding a threshold.

5. The method of claim 1, wherein the request to lower the first PDCCH load of the at least one neighboring cell is conditioned upon a number of UEs using voice over Internet protocol, VoIP, exceeding a threshold.

6. The method of claim 1, wherein the request to lower the first PDCCH load of the at least one neighboring cell is conditioned upon a channel quality indication from at least one UE falling below a threshold.

7. The method of claim 1, wherein the response from the at least one neighboring cell comprises an indication as to whether the base station serving the at least one neighboring cell is in a capable state indicating a capability to lower the first PDCCH load in response to the request.

8. The method of claim 1, further comprising generating an indication as to whether the first base station is in a capable state that is indicative of a capability to lower a second PDCCH load of the first cell associated with the first base station in order to assist the at least one neighboring cell.

9. The method of claim 8, wherein the indicated capability is based on a current capacity utilization of the first cell, and wherein the current capacity utilization is one of a number of voice over Internet protocol, VoIP, users and a number of cell-edge users in the first cell.

10. The method of claim 8, wherein the indicated capability is based on a bandwidth of the first cell, a total number of users in the first cell, and a traffic type of the users of the first cell.

11. A base station in a wireless communication system, the base station serving at least a first cell, the base station comprising:
a memory, the memory configured to store:
a request directed to at least one neighboring cell to lower a first physical downlink control channel, PDCCH, load of the at least one neighboring cell, the PDCCH load of a cell being a ratio of used resource elements to total available resource elements within the cell; and
a transmitter, the transmitter configured to:
send the request to at least one base station serving the at least one neighboring cell, in response to a detection of an inter-cell interference, ICI, condition;
a receiver configured to receive a response from the at least one neighboring cell, wherein the response is indicative of whether and to what extent a base station serving the at least one neighboring cell will lower the first PDCCH load of the at least one neighboring cell, wherein the base station serving the at least one neighboring cell informs the first cell regarding a predefined time duration to be in a helping state to lower the first PDCCH load, and wherein the first cell is configured to automatically request the at least one neighboring cell to renew the helping state; and
a processor, the processor configured to:
detect the ICI condition between the first cell and the at least one neighboring cell; and
based on a response received from the at least one neighboring cell, determine to what extent to increase a PDCCH load of the first cell.

12. The base station of claim 11, wherein the ICI condition is detected by the processor when a number of user equipments, UEs, in the first cell exceeds a threshold.

13. The base station of claim 11, wherein the receiver is further configured to receive a request from the base station serving the at least one neighboring cell to lower a second PDCCH load associated with the first cell.

14. The base station of claim 13, wherein the processor is further configured to generate an indication as to whether the base station is in a capable state that is indicative of a capability to lower the second PDCCH load in order to assist the at least one neighboring cell.

15. A method of allocating physical downlink control channel, PDCCH, resources in a wireless communication system, the method comprising:
receiving at a first base station serving a first cell, from a base station serving a neighboring cell, a request to lower a first PDCCH load of the first cell to reduce inter-cell interference, ICI, between the first cell and the neighboring cell, a PDCCH load of a cell being a ratio of used resource elements to total available resource elements within the cell;
determining whether to lower the first PDCCH load of the first cell, the determination being based on an extent to which a capacity to serve user equipments in the first cell is available;
transmitting a response for the first cell indicative of whether and to what extent the first base station will lower the first PDCCH load of the first cell, wherein the first base station serving the first cell informs the neighboring cell regarding a predefined time duration to be in a helping state to lower the first PDCCH load, wherein the neighboring cell is configured to automatically request the first cell to renew the helping state, and wherein based on the transmitted response, the base station serving the neighboring cell determines an extent to which the base station serving the neighboring cell will increase a PDCCH load of the neighboring cell.

16. The method of claim 15, further comprising sending from the first base station to the base station serving the neighboring cell, a request for the base station serving the neighboring cell to lower a second PDCCH load of the neighboring cell.

17. A base station in a wireless communication system, the base station serving at least a first cell, the base station comprising:
a memory, the memory configured to store:
a request received from a neighboring cell to lower a first physical downlink control channel, PDCCH, load of the first cell, a PDCCH load of a cell being a ratio of used resource elements to total available resource elements within the cell; and
a processor in communication with the memory, the processor configured to:
determine whether to lower the first PDCCH load of the first cell, wherein the determination is based on an extent to which a capacity to serve the user equipments in the first cell is available; and a receiver in communication with the processor and the memory, wherein the receiver is configured to receive the request; and a transmitter configured to send a response to the neighboring cell indicative of whether and to what extent the base station will lower the first PDCCH load of the first cell, wherein the base station serving the first cell informs the neighboring cell regarding a predefined time duration to be in a helping state to lower the first PDCCH load, wherein the neighboring cell is configured to automatically request the first cell to renew the helping state, and wherein based on the transmitted response, a base station serving the neighboring cell is configured to determine an extent to which the base station serving the neighboring cell will increase a PDCCH load of the neighboring cell.

18. The base station of claim 17, wherein the transmitter is further configured to send a request to the base station serving the neighboring cell requesting that a second PDCCH load of the neighboring cell be lowered.

19. The base station of claim 18, wherein the receiver is further configured to receive a response to the request to the base station serving the neighboring cell, and wherein the response indicates an extent to which the base station serving the neighboring cell will lower the PDCCH load of the neighboring cell.

20. A base station, comprising:
a receiver module for receiving a request from a neighboring cell to lower a physical downlink control channel, PDCCH, load for a first cell served by the base station, a PDCCH load of a cell being a ratio of used resource elements to total available resource elements within the cell;
a determiner module for determining whether to lower a first PDCCH load based on an extent to which a capacity to serve user equipments in the first cell is available; and
a transmitter module for transmitting a response to the neighboring cell indicative of whether and to what extent the base station will lower the first PDCCH load of the first cell, wherein the base station serving the first cell informs the neighboring cell regarding a predefined time duration to be in a helping state to lower the first PDCCH load, wherein the neighboring cell is configured to automatically request the first cell to renew the helping state, and wherein based on the transmitted response, a base station serving the neighboring cell determines an extent to which the base station serving the neighboring cell will increase a PDCCH load of the neighboring cell.

21. The base station of claim 20, wherein the transmitter module is configured to transmit, to the base station serving the neighboring cell, an indication that the first PDCCH load is to be lowered.

22. A base station, comprising:
a determiner module for determining whether a condition of inter-cell interference, ICI, exists between a first cell served by the base station and at least one neighboring cell;
a transmitter module for transmitting a request to lower a physical downlink control channel, PDCCH, load of the at least one neighboring cell to reduce the ICI, a PDCCH load of a cell being a ratio of used resource elements to total available resource elements within the cell;
a receiver for receiving a response for the neighboring cell indicative of whether and to what extent a base station serving the neighboring cell will lower a first PDCCH load, wherein the base station serving the neighboring cell informs the first cell regarding a predefined time duration to be in a helping state to reduce the first PDCCH load in the at least one neighboring cell, and wherein the first cell is configured to automatically request the at least one neighboring cell to renew the helping state: and
a PDCCH load determiner to determine, based on the response received from the at least one neighboring cell, to what extent to increase a PDCCH load of the first cell.

* * * * *